(12) United States Patent
Kumagai et al.

(10) Patent No.: US 12,153,694 B2
(45) Date of Patent: Nov. 26, 2024

(54) IMAGE PROCESSING APPARATUS CAPABLE OF EXECUTING SCAN PROCESSING BASED ON REQUEST FROM CLIENT TERMINAL, AND CONTROL METHOD THEREFOR TO CAUSE A CLIENT TERMINAL TO SEND A PASSWORD TO AN IMAGE PROCESSING APPARATUS USING ENCRYPTED COMMUNICATION TEMPORARILY IN A CASE WHERE A SCAN REQUEST INCLUDES A DESIGNATION FOR AN ENCRYPTED FILE

(71) Applicant: CANON KABUSHIKI KAISHA, Tokyo (JP)

(72) Inventors: Takekazu Kumagai, Kanagawa (JP); Yusuke Kobana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/480,284

(22) Filed: Oct. 3, 2023

(65) Prior Publication Data

US 2024/0119165 A1  Apr. 11, 2024

(30) Foreign Application Priority Data

Oct. 5, 2022 (JP) .................. 2022-160961

(51) Int. Cl.
*G06F 21/60* (2013.01)
*H04L 9/32* (2006.01)
*H04N 1/00* (2006.01)

(52) U.S. Cl.
CPC .......... *G06F 21/608* (2013.01); *H04L 9/3226* (2013.01); *G06F 2221/2107* (2013.01)

(58) Field of Classification Search
CPC .. G06F 21/606; G06F 21/608; G06F 21/6209; G06F 21/6218; G06F 3/1285; G06F 3/1293; G06F 3/1294; G06F 3/1238; H04N 1/444; H04N 1/4486; H04N 1/32272; H04N 2221/2107; H04L 9/3226
USPC ..... 358/1.11–1.18; 726/1, 16, 17, 21, 26, 27
See application file for complete search history.

(56) References Cited

U.S. PATENT DOCUMENTS

2016/0316353 A1* 10/2016 Kawakami .......... H04L 61/5007
2022/0159437 A1*  5/2022 Yamada ................ H04W 72/56
2022/0283757 A1*  9/2022 Inoue .................. H04N 1/00854

FOREIGN PATENT DOCUMENTS

JP       2020065129 A     4/2020

\* cited by examiner

*Primary Examiner* — Chad Dickerson
(74) *Attorney, Agent, or Firm* — Canon U.S.A., Inc. IP Division

(57) ABSTRACT

An image processing apparatus includes an execution unit configured to execute processing of generating a file including image data obtained by using a scanner and transmitting the file to a client terminal, wherein, in a case where an encrypted file is designated by the client terminal for the file, at least one of communication for transmitting a password to be used in generation of the encrypted file from the client terminal to the image processing apparatus and communication for transmitting the file generated in the image processing apparatus to the client terminal is encrypted communication.

8 Claims, 17 Drawing Sheets

FIG.9A

```
POST /ScanJob HTTP/1.1
Host:192.168.1.100
Content-Type: text/xml
Content-Length:342

<?xml version="1.0" encoding="UTF-8"?>
  <ScanJob>
    <Source>Platen</Source>
    <Direction>ShortEdgeFeed</Direction>
    <Size>A4</Size>
    <Format>EncrtyptedPDF</Format>
    <EncryptionPassword>0101</EncryptionPassword>
    <ColorMode>Color</ColorMode>
    <Resolution>300</Resolution>
  </ScanJob>
```

FIG.9B

```
HTTP/1.1 201 Created

Location: https://192.168.1.100/ScanJob/1
```

FIG.9C

```
HTTP/1.1 201 Created

Location: http://192.168.1.100/ScanJob/1
```

FIG.10A

```
HTTP/1.1 200 OK
Content-Type: text/xml
Content-Length:184

<?xml version="1.0" encoding="UTF-8"?>
  <ScannerStatus>
    <State>Scanning</State>
    <ScanPage>1</ScanPage>
    <JobStatus>Processing</JobStatus>
  </ScannerStatus>
```

FIG.10B

```
HTTP/1.1 200 OK
Content-Type: text/xml
Content-Length:183

<?xml version="1.0" encoding="UTF-8"?>
  <ScannerStatus>
    <State>Idle</State>
    <ScanPage>3</ScanPage>
    <JobStatus>Completed</JobStatus>
    <JobResult>Success</JobResult>
  </ScannerStatus>
```

FIG.16A

```
POST /ScanJob HTTP/1.1
Host:192.168.1.100
Content-Type: text/xml
Content-Length:342

<?xml version="1.0" encoding="UTF-8"?>
  <ScanJob>
    <Source>Platen</Source>
    <Direction>ShortEdgeFeed</Direction>
    <Size>A4</Size>
    <Format>EncrtyptedPDF</Format>
    <ColorMode>Color</ColorMode>
    <Resolution>300</Resolution>
  </ScanJob>
```

FIG.16B

```
HTTP/1.1 201 Created

Location: http://192.168.1.100/ScanJob/1/
```

FIG.17A

```
POST /ScanJob/1 HTTP/1.1
Host:192.168.1.100
Content-Type: text/xml
Content-Length:124

<?xml version="1.0" encoding="UTF-8"?>
  <ScanJob>
     <EncryptionPassword>0101</EncryptionPassword>
  </ScanJob>
```

FIG.17B HTTP/1.1 200 OK

IMAGE PROCESSING APPARATUS CAPABLE OF EXECUTING SCAN PROCESSING BASED ON REQUEST FROM CLIENT TERMINAL, AND CONTROL METHOD THEREFOR TO CAUSE A CLIENT TERMINAL TO SEND A PASSWORD TO AN IMAGE PROCESSING APPARATUS USING ENCRYPTED COMMUNICATION TEMPORARILY IN A CASE WHERE A SCAN REQUEST INCLUDES A DESIGNATION FOR AN ENCRYPTED FILE

BACKGROUND

Field

The present disclosure relates to processing in an image processing apparatus that executes scan processing based on a request from an information processing apparatus, and processing in an information processing apparatus that issues a scan request.

Description of the Related Art

Conventionally, there is a mechanism in which an image processing apparatus scans a paper document based on a request sent from an information processing apparatus via a network, and transmits image data obtained by the scan to a specific destination. A form in which an image processing apparatus transmits scanned image data to a transmission destination designated in a request from an external apparatus is called "push scan". On the other hand, a form in which, in response to a request received from an information processing apparatus via a network, an image processing apparatus transmits scanned image data to an information processing apparatus that is the source of the request is called "pull scan".

As a conventional technique, Japanese Patent Application Laid-Open No. 2020-65129 discusses a technique for the push scan.

Specifically, the technique is characterized in that when a communication terminal, such as a smartphone, requests a multi-function peripheral (MFP) to scan an original document, the MFP issues an instruction to create a signed file.

Meanwhile, an image processing apparatus has a function of encrypting a file including scanned image data, using a password or the like, when generating the file. In a case where encryption of a generated file is instructed in a scan request from an information processing apparatus, it is necessary to transmit data such as a password for the encryption from the information processing apparatus to the image processing apparatus. In communication between the information processing apparatus and the image processing apparatus on a network, a secure communication channel is not necessarily ensured. For this reason, there is a possibility that when a password for encryption is transmitted from the information processing apparatus, and when a file including scan data is acquired, the communicated data can leak. Therefore, even if a file itself is encrypted by the image processing apparatus that encrypts the file itself in response to a scan request, security as expected by a request source may not be necessarily ensured.

Japanese Patent Application Laid-Open No. 2020-65129 described above does not discuss a technique of generating an encrypted file and transmitting the encrypted file.

SUMMARY

The present disclosure is directed to offering a more secure technique than the conventional technique in a case where a file including scanned image data is encrypted in response to a scan request from an external apparatus.

According to an aspect of the present disclosure, an image processing apparatus including a scanner includes an execution unit configured to execute processing of generating a file including image data obtained by the image processing apparatus using the scanner and transmitting the file to a client terminal, based on a plurality of requests issued from the client terminal via communication on a network, wherein, in a case where an encrypted file is designated by the client terminal for the file, at least one of communication for transmitting a password to be used in generation of the encrypted file from the client terminal to the image processing apparatus and communication for transmitting the file generated in the image processing apparatus to the client terminal is encrypted communication.

Further features of the present disclosure will become apparent from the following description of exemplary embodiments with reference to the attached drawings.

BRIEF DESCRIPTION OF THE DRAWINGS

FIGS. 9A to 9C are diagrams illustrating an example of communication content in pull scan according to the first exemplary embodiment.

FIGS. 10A and 10B are diagrams illustrating communication content in scanner status acquisition according to the first exemplary embodiment.

FIGS. 16A and 16B are diagrams illustrating an example of communication content in pull scan according to the third exemplary embodiment.

FIGS. 17A and 17B are diagrams illustrating an example of communication content in encryption password setting according to the third exemplary embodiment.

DESCRIPTION OF THE EMBODIMENTS

Exemplary embodiments of the present disclosure will be described below with reference to the drawings.

Figure 1:
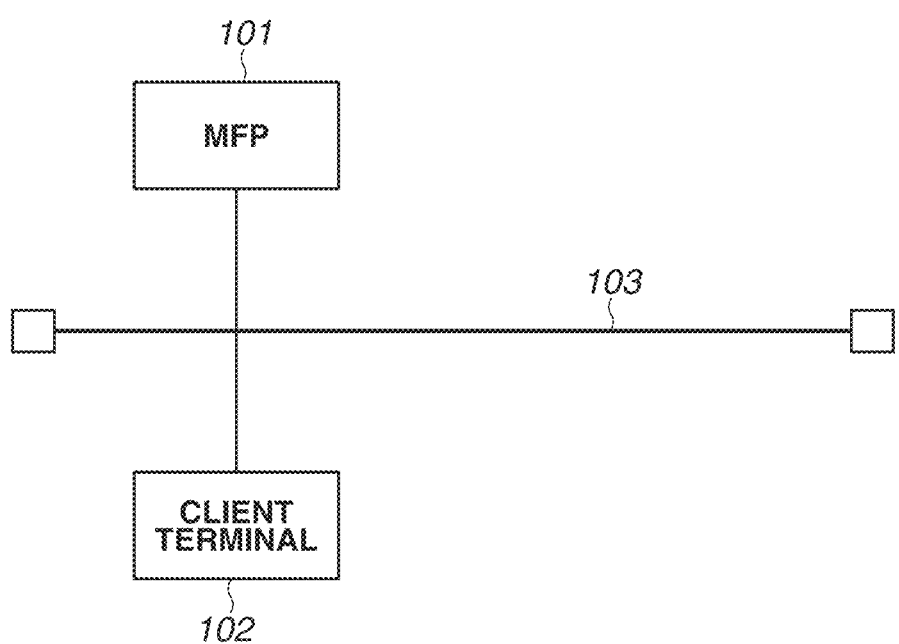
FIG. 1 is a diagram illustrating an example of a system configuration.

An example of a system configuration including a network in a first exemplary embodiment will be described with reference to FIG. 1. In an image processing system illustrated in FIG. 1, a multi-function peripheral (MFP) 101 that is an example of an image processing apparatus and a client terminal 102 are connected to each other via a network 103. The network 103 is further connected to the Internet (not illustrated) or the like, and connected to a storage service (not illustrated) on a network.

The MFP 101 is an example of an image processing apparatus employing an electrophotographic method, and has scan, copy, and print functions. The MFP 101 has a function of transmitting an image read by a scanner to an external apparatus such as the client terminal 102 via the network 103. The client terminal 102 is a general information processing apparatus such as a personal computer (PC) or a smartphone. As an example of the network 103, a wired local area network (LAN) is used, but a wireless LAN such as Wi-Fi may be used.

Figure 2:
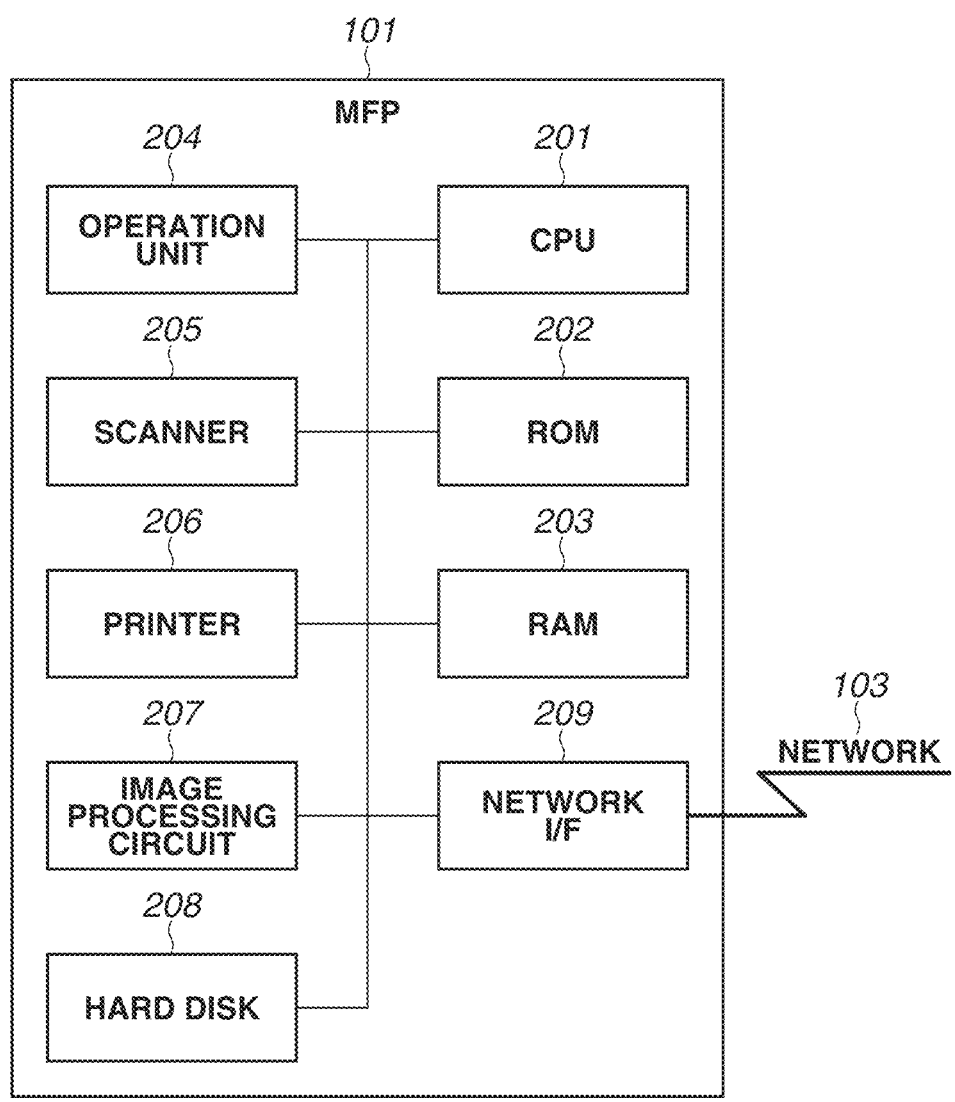
FIG. 2 is a diagram illustrating an example of a hardware configuration of a multi-function peripheral (MFP) (image processing apparatus).

An example of a hardware configuration of the MFP 101 that is an example of the image processing apparatus will be described with reference to FIG. 2. The MFP 101 includes a central processing unit (CPU) 201, a read only memory (ROM) 202, a random access memory (RAM) 203, an operation unit 204, a scanner 205, a printer 206, an image processing circuit 207, a hard disk 208, and a network interface (I/F) 209. The CPU 201 is a control circuit that controls the entire system, using a program stored in the ROM 202 and a memory of the RAM 203. The operation unit 204 is a circuit that executes a user operation. The scanner 205 reads an image on an original document and sequentially outputs the read image for each page in order. The printer 206 prints an image on a recording medium based on image data. The image processing circuit 207 includes a large-capacity image memory, an image rotation circuit, a resolution scaling circuit, an encoding/decoding circuit using a method such as Modified Huffman (MH), Modified Read (MR), Modified Modified Read (MMR), Joint Bi-level Image Experts Group (JBIG), or Joint Photographic Experts Group (JPEG), and the image processing circuit 207 can execute various types of image processing such as shading, trimming, and masking. The hard disk 208 is a large-capacity storage medium connected by an I/F such as Small Computer System Interface (SCSI) or Integrated Drive Electronics (IDE). A program body related to pull scan according to the present exemplary embodiment, environment settings to be referred to when a program runs, and the like are stored in the hard disk 208. The network I/F 209 is a circuit for connection to the network 103. The scanner 205, the printer 206, and the image processing circuit 207 are connected by a high-speed video bus that is different from a bus from the CPU 201, and therefore can transmit images at high speed. The MFP 101 performs image processing for an image read by the scanner 205, using the image processing circuit 207. Examples of the image processing apparatus to which the present disclosure is applicable include a network scanner that does not include the printer 206.

The MFP 101 has an "encryption of network communication" setting as a setting item to be referred to when performing processing in response to a scan request from the client terminal 102. In the MFP 101, valid (ON) or invalid (OFF) is stored in the hard disk 208, as the setting value of this "encryption of network communication" setting. In a case where the "encryption of network communication" setting is valid, encryption of a network communication path for communication executed in response to a scan request (e.g., Hypertext Transfer Protocol Secure (HTTPS) communication) is performed between the MFP 101 and the client terminal 102. The encryption of the network communication path is premised based on appropriate settings at both of a communication source and a communication destination, and thus, in the MFP 101, the initial value of this "encryption of network communication" setting is invalid (OFF).

Figure 3:
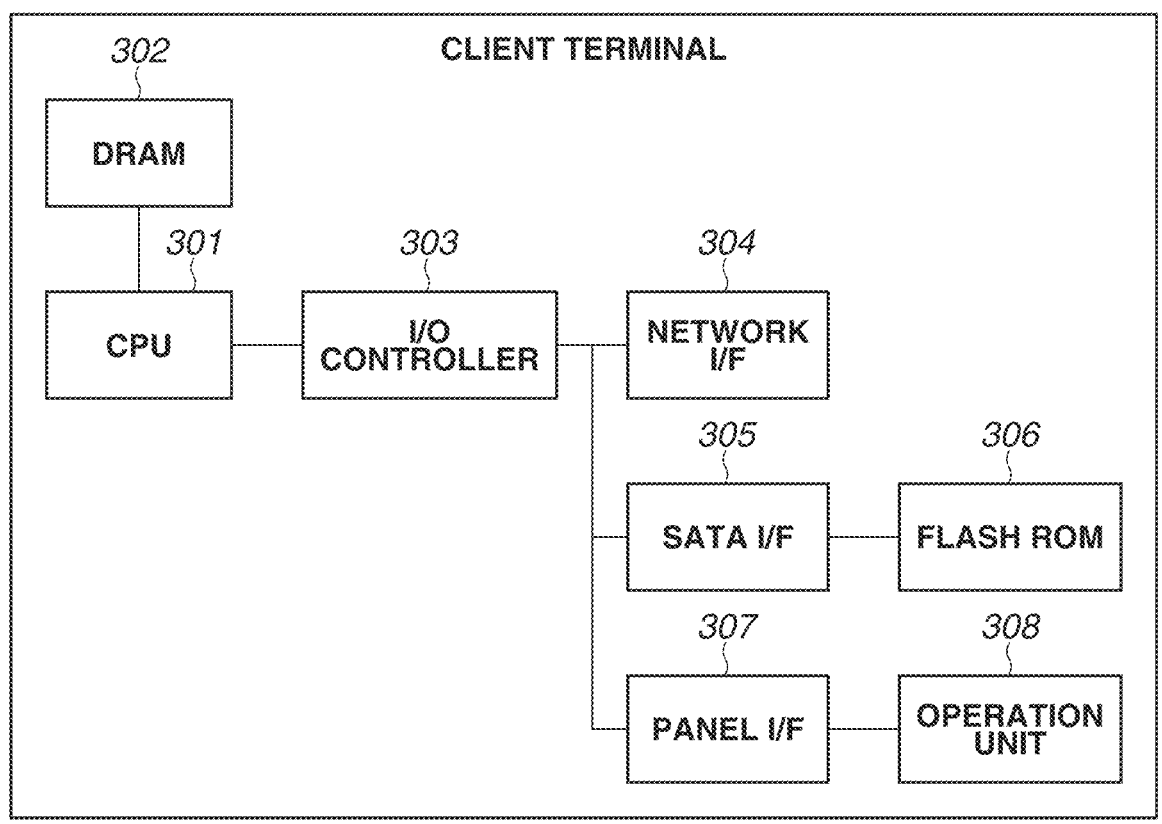
FIG. 3 is a diagram illustrating an example of a hardware configuration of a client terminal (information processing apparatus).

An example of a hardware configuration of the client terminal 102 that is an example of the information processing apparatus will be described with reference to FIG. 3. A CPU 301 is connected to a dynamic random access memory (DRAM) 302 via a bus. The DRAM 302 is used by the CPU 301 as a work memory for temporarily placing program data representing computing instructions and processing-target data in a process in which the CPU 301 performs computing. The CPU 301 is connected to an input/output (I/O) controller 303 via a bus. A network I/F 304 is connected to the I/O controller 303. A wired LAN device, a wireless LAN device, or a data communication device is connected to the network I/F 304. The CPU 301 implements communications on the network 103 by controlling the wired LAN device, the wireless LAN device, or the data communication device via the network I/F 304. The I/O controller 303 performs input/output for various devices based on instructions of the CPU 301. A Serial Advanced Technology Attachment (SATA) I/F 305 is connected to the I/O controller 303, and a flash ROM 306 is connected to the SATA I/F 305. Instead of the flash ROM, a large-capacity storage unit such as a hard disk drive (HDD) may be connected.

A program such as a scan application according to the exemplary embodiments to be described below and setting values to be used therefor are stored in the flash ROM 306. To implement processing in the client terminal 102 to be described in those exemplary embodiments, the CPU 301 executes programs such as the scan application. A panel I/F 307 is connected to the I/O controller 303, and the CPU 301 implements input/output to/from an operation unit 308 of the client terminal 102 connected via the panel I/F 307, for a user. Examples of the operation unit 308 include a touch panel also serving as a display device. The operation unit 308 may be implemented by using a display or the like as a display device and connecting an input device such as a keyboard for input, to the panel I/F 307.

An example of a scan setting screen of the scan application provided on the display device of the client terminal 102 will be described with reference to FIG. 4.

Buttons 401 to 407 are buttons for read settings in the MFP 101, and each of the buttons 401 to 407 displays the current setting value. The content set here is transmitted as a scan request to the MFP 101 via the network, and is used for scanning of an original document, generation of a file including scanned image data, and the like in the MFP 101. In the case of a scan request for pull scan, a transmission destination of a generated file is the client terminal 102, and thus, a setting of a transmission destination is omitted in this setting screen.

The button 401 is a "reading target" setting button, which is a button for setting a reading target (a pressing plate or a feeder). The button 402 is a "sheet size" setting button, which is a button for setting a sheet size (e.g., A4 size or A3 size) to be read. The button 403 is a "color mode" setting button, which is a button for setting a color mode (color or monochrome) in scan. The button 404 is a "resolution" setting button", which is a button for setting a resolution (e.g., 300 dpi or 600 dpi) in scan. The button 405 is a "feed direction" setting button, which is a button for setting a feed direction (longitudinal feed or transverse feed) of an original document.

The button 406 is a "file format" setting button, which is a button for setting a file format of a file including scanned image data transmitted from the MFP 101. The file format can be selected from a plurality of file formats including JPEG, unencrypted portable document format (PDF), and encrypted PDF. The button 407 is an "encryption password" setting button, which is a button for setting an encryption password, and can be selected in a case where "encrypted PDF" is selected by the "file format" setting button 406. In a case where the button 407 is selected, a password input screen is displayed, so that a user can set any password. In FIG. 4, input characters are each replaced by "*" and displayed to hide the characters input as an encryption password.

The button 408 is a "start scan" button, which is a button for starting scan processing. The button 409 is a "cancel" button, which is a button for closing this application.

Figure 5:
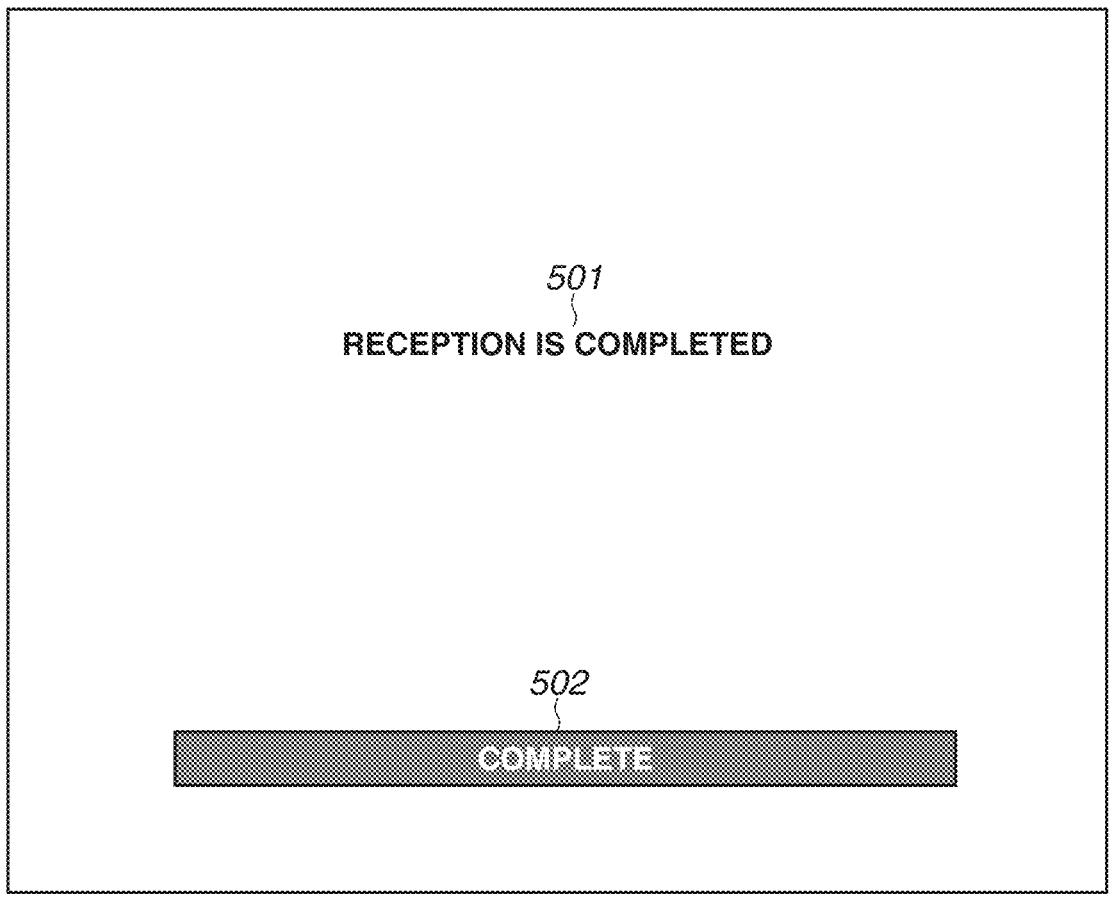
FIG. 5 is a diagram illustrating a reception completion screen of the scan application.

FIG. 5 illustrates an example of a reception completion screen provided by the scan application when a file including scanned image data is received from the MFP 101. A message indicating that reception is completed is displayed in a reception completion area 501. Although not illustrated, an error message or an error code is displayed in this area in a case where a reception error occurs. A "complete" button 502 is a button for closing the scan application.

Figure 6:
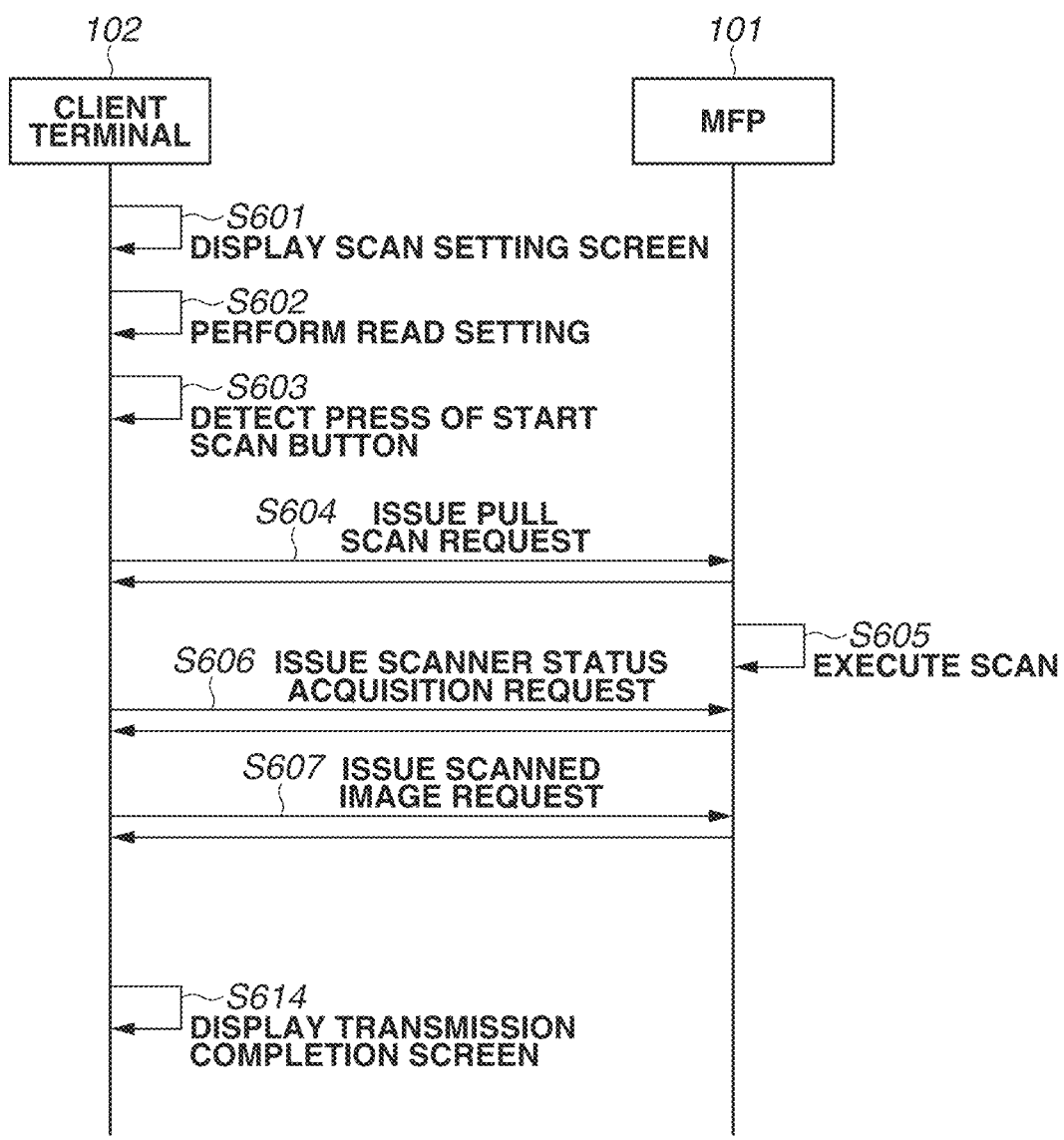
FIG. 6 is a diagram illustrating a sequence of processing performed by an MFP and a client terminal according to a first exemplary embodiment.

A sequence of processing to be performed in the MFP 101 and the client terminal 102 in the present exemplary embodiment will be described with reference to FIG. 6. HTTP or HTTPS is used for each communication between the MFP 101 and the client terminal 102, which will be described with reference to FIG. 6 and subsequent figures. The description will be given based on the premise that the IP address of the MFP 101 is "192.168.1.100".

Figure 4:
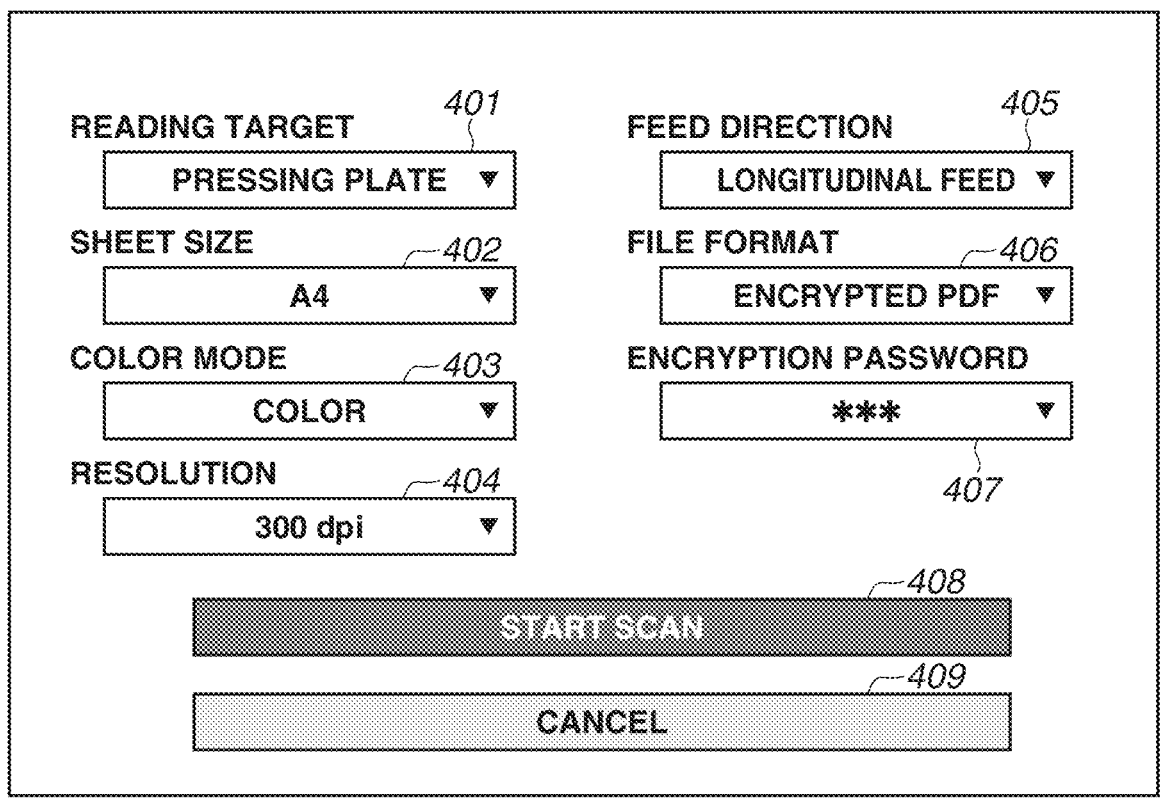
FIG. 4 is a diagram illustrating a scan setting screen of a scan application of the client terminal.

In step S601, the client terminal 102 displays a scan setting screen similar to the screen illustrated in FIG. 4. In step S602, the client terminal 102 accepts a read setting operation, and makes a setting based on the read setting operation.

Here, a case where encrypted PDF is selected by the "file format" setting button 406 and an appropriate character string is set by the "encryption password" setting button 407 in the client terminal 102 will be described. In step S603, the client terminal 102 detects the press of the "start scan" button 408.

In step S604, the client terminal 102 issues a pull scan request to the MFP 101, and the MFP 101 responds to the request.

In step S605, the MFP 101 executes scan processing.

In step S606, the client terminal 102 issues a scanner status acquisition request to the MFP 101, and the MFP 101 responds to the. In this step, the client terminal 102 changes processing based on whether the scan processing is completed. In this sequence, a case where the scan processing is completed will be described.

In a case where the scan processing is completed, in step S607, the client terminal 102 issues a scanned image request to the MFP 101, and the MFP 101 responds to the request. In step S614, the client terminal 102 displays a transmission completion screen similar to the screen illustrated in FIG. 5.

Figure 7:
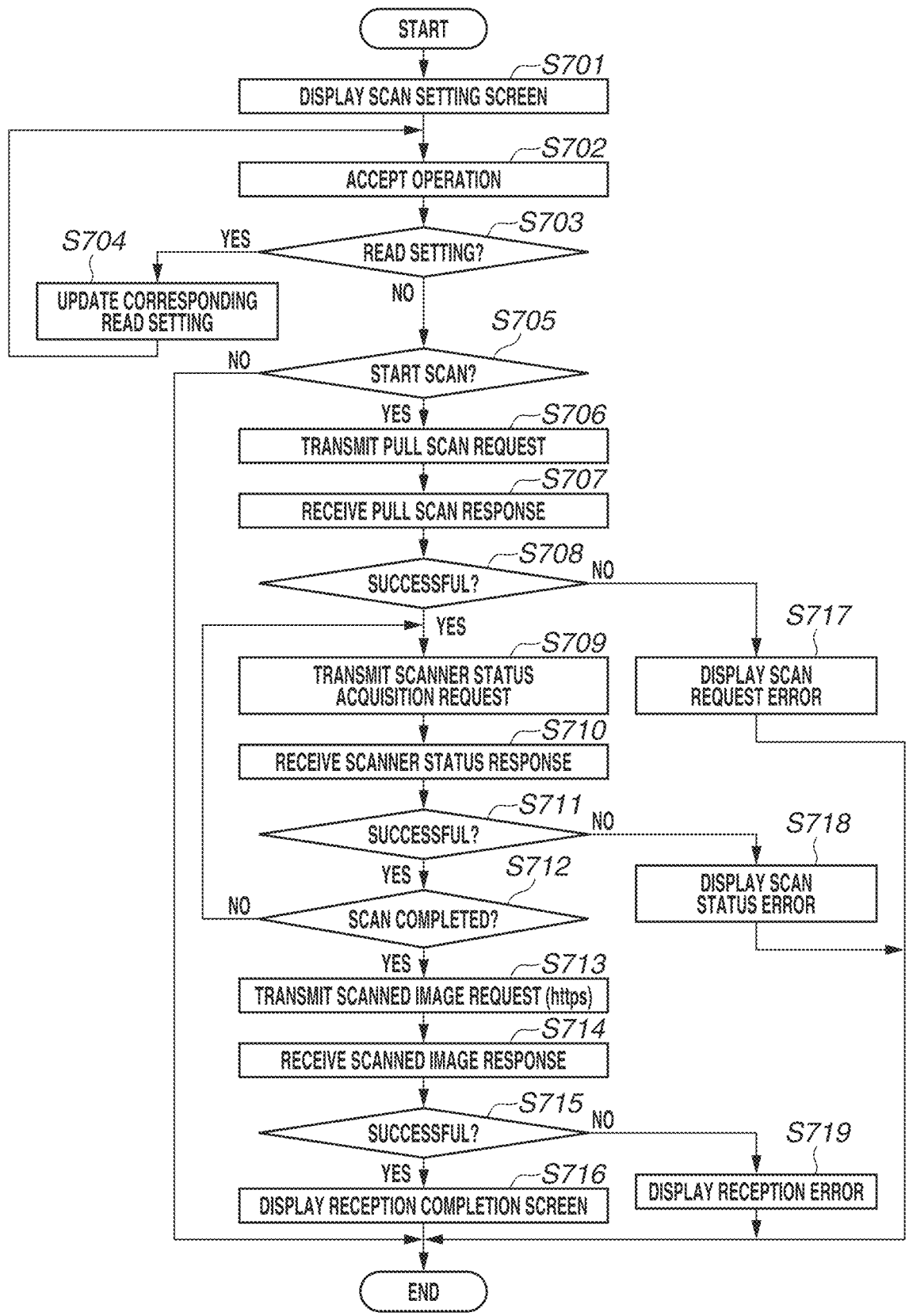
FIG. 7 is a flowchart illustrating processing in the client terminal according to the first exemplary embodiment.

FIG. 7 is a flowchart illustrating processing in the client terminal 102 in the present exemplary embodiment. The CPU 301 of the client terminal 102 executes the scan application, whereby the processing illustrated in FIG. 7 is implemented.

In step S701, the client terminal 102 displays a scan setting screen similar to the screen illustrated in FIG. 4. In step S702, the client terminal 102 accepts an operation from a user. In step S703, the client terminal 102 determines whether the accepted operation is a read setting operation. In a case where any of the buttons 401 to 407 for a read setting is pressed, the client terminal 102 determines that the accepted operation is a read setting operation. In a case where the accepted operation is a read setting operation (YES in step S703), the processing proceeds to step S704. In step S704, the client terminal 102 updates the corresponding read setting. The processing returns to step S702 thereafter. In a case where the accepted operation is not a read setting operation (NO in step S703), the processing proceeds to step S705. In step S705, the client terminal 102 determines whether the accepted operation is a scan start operation. In a case where the "start scan" button 408 is pressed, the client terminal 102 determines that the accepted operation is a scan start operation. In a case where the accepted operation is a scan start operation (YES in step S705), the processing proceeds to step S706. In a case where the application ends without acceptance of a scan start operation such as a case where cancel processing is to be performed (NO in step S705), this processing also ends.

In step S706, the client terminal 102 transmits a pull scan request to the MFP 101.

FIG. 9A illustrates an example of the content of the pull scan request. The request is issued using a POST method to a Uniform Resource Identifier (URI) of "http://192.168.1.100/ScanJob". The setting is described below a ScanJob element of a message body part in Extensible Markup Language (XML) format.

A Source element represents a reading target, and "Platen" indicates that the reading target is a pressing plate. A Direction element represents a feed direction, and "ShortEdgeFeed" indicates that the feed direction is short-side feed. A Size element represents a sheet size to be read, and "A4" indicates that the sheet size to be read is A4. A Format element represents file transmission, and "EncryptedPDF" indicates that the file format is an encrypted PDF format. An EncryptionPassword element represents an encryption password, and "0101" indicates that the encryption password is 0101. A ColorMode element represents a color mode, and "Color" indicates that the color mode is color. A Resolution element represents a resolution in scan.

In step S707, the client terminal 102 receives a pull scan response from the MFP 101.

FIG. 9B illustrates an example of a response to the HTTP request by POST when the request is successful. "Location: https://192.168.1.100/ScanJob/1" indicates a URI for acquiring the scanned image of the requested pull scan.

Here, an encrypted communication path can be used by using https as a protocol for acquiring an image. In a case where encrypted communication is not used, http is used instead of https.

In step S708, the client terminal 102 confirms the content of the pull scan response and determines whether the reception of the response is successful. In a case where the reception of the response is successful (YES in step S708), the processing proceeds to step S709. In a case where the reception of the response is unsuccessful (NO in step S708), the processing proceeds to step S717. In step S717, the client terminal 102 displays the reception completion screen illustrated in FIG. 5 on the operation unit 308, and the processing ends thereafter. In this case, a message notifying that an error has occurred is displayed in the reception completion area 501.

In step S709, the client terminal 102 transmits a scanner status acquisition request to the MFP 101. The request is issued using a GET method to a URI of "http://192.168.1.100/ScannerStatus". To this request, a response illustrated in FIG. 10A or FIG. 10B is transmitted from the MFP 101. In step S710, the client terminal 102 receives this response as a scanner status response.

The details of the scanner status is described below a ScannerStatus element of a message body part in XML format. A State element represents the status of a scan job. "Scanning" indicates that scan is being performed, and "Idle" indicates a standby state. A ScanPage element represents the number of pages for which scan is completed. A JobStatus element represents the status of the scan job. "Processing" indicates that the job is being processed, and "Completed" indicates that the job is completed. A JobResult element represents the result of the scan job, and "Success" indicates normal termination.

In step S711, the client terminal 102 determines whether the reception of the scanner status response is successful. In a case where the reception of the scanner status response is successful (YES in step S711), the processing proceeds to step S712. In a case where the reception of the scanner status response is unsuccessful (NO in step S711), the processing proceeds to step S718. In step S718, the client terminal 102 displays the reception completion screen illustrated in FIG. 5 on the operation unit 308, and thereafter the processing ends. In this case, a message notifying that an error has occurred is displayed in the reception completion area 501.

In step S712, the client terminal 102 determines whether the scan job requested in step S706 is completed. The client terminal 102 determines that the scan job is completed in a case where the JobStatus element indicates "Completed". In a case where the scan job is not completed (NO in step S712), the processing returns to step S709.

In a case where the client terminal 102 determines that the scan job is completed (YES in step S712), the processing proceeds to step S713. In step S713, the client terminal 102 transmits a scanned image request to the MFP 101. The request is issued using a GET method to the URI in the response received in step S707. To this request, binary data representing the scanned image is transmitted from the MFP 101 as a response. In step S714, the client terminal 102 receives this response.

In step S715, the client terminal 102 determines whether the reception of the binary data representing the scanned image, i.e., the reception of the response, is successful. In a case where the reception is successful (YES in step S715), the processing proceeds to step S716. In a case where the reception is unsuccessful (NO in step S715), the processing proceeds to step S719.

In step S716, the client terminal 102 displays the reception completion screen illustrated in FIG. 5, and the processing ends. In this step, a message notifying that the reception is completed is displayed in the reception completion area 501.

In step S719, the client terminal 102 displays the reception completion screen on the operation unit 308, and the processing ends. In this step, a message notifying that an error has occurred is displayed in the reception completion area 501.

Figure 8:
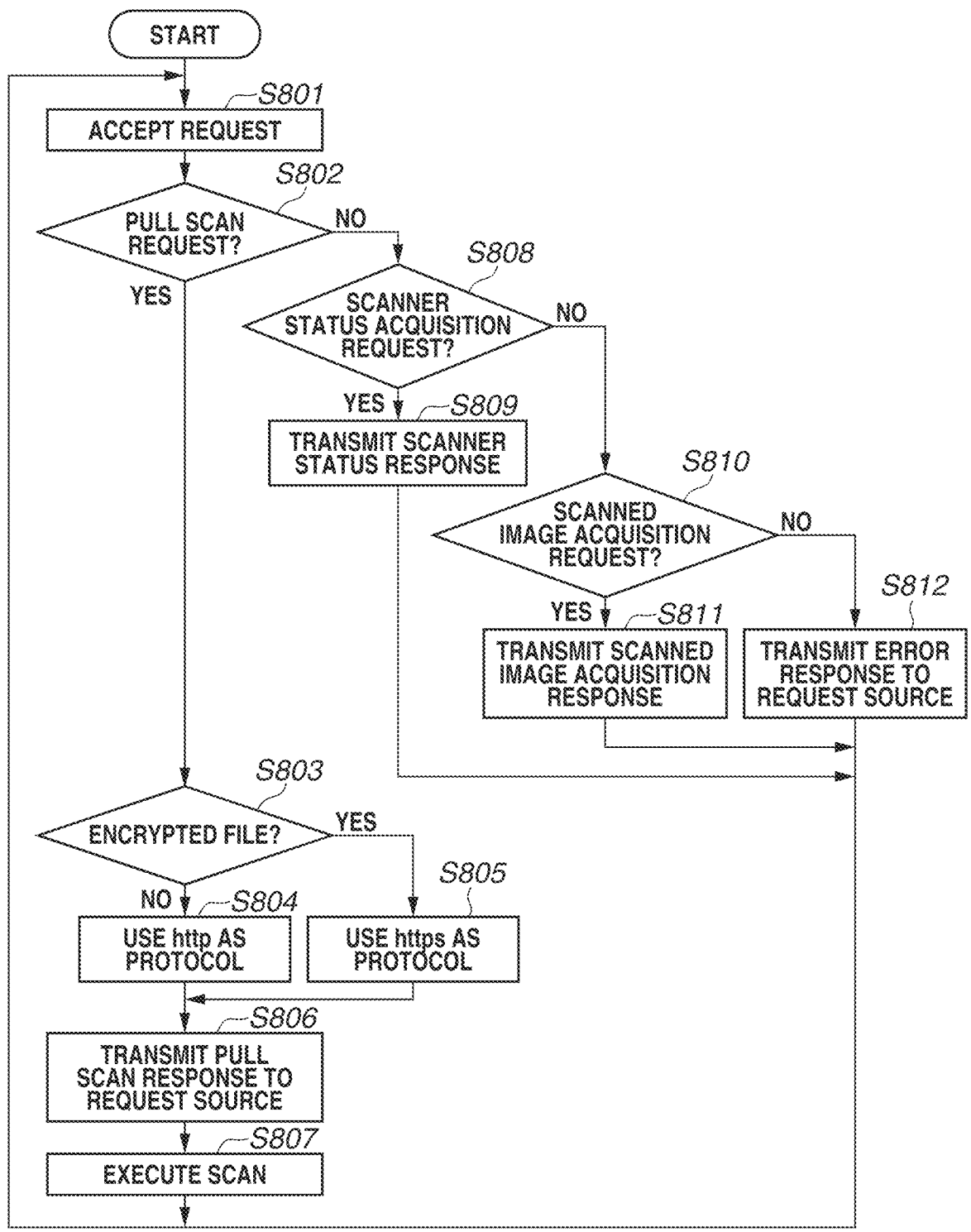
FIG. 8 is a flowchart illustrating processing in the MFP according to the first exemplary embodiment.

FIG. 8 is a flowchart illustrating processing in the MFP 101 in the present exemplary embodiment. The CPU 201 of the MFP 101 executes a program according to this processing, whereby the processing in FIG. 8 is implemented.

In step S801, the MFP 101 accepts a request. In step S802, the MFP 101 determines whether the request is a pull scan request. The MFP 101 determines that the request is a pull scan request in a case where the request is a POST method to "http://192.168.1.100/ScanJob" or "https://192.168.1.100/ScanJob", and in a case where a Destination element is not included below a ScanJob element of a message body part in XML format. In a case where the request is not a pull scan request (NO in step S802), the processing proceeds to step S808.

In a case where the request is a pull scan request (YES in step S802), the processing proceeds to step S803. In step S803, the MFP 101 confirms the value of the Format element of the pull scan request and determines whether the file format is an encrypted file format. In a case where the value is EncryptedPDF, the MFP 101 determines that the file format is an encrypted file format. In a case where the file format is an encrypted file format (YES in step S803), the processing proceeds to step S805. In a case where the file format is not an encrypted file format (NO in step S803), the processing proceeds to step S804.

In step S804, the MFP 101 issues a URI for acquiring a scanned image, and generates a pull scan response similar to a response illustrated in FIG. 9C. Here, a protocol for Location is http.

In step S805, the MFP 101 issues a URI for acquiring a scanned image, and generates a pull scan response similar to a response illustrated in FIG. 9B. Here, a protocol for Location is https. The MFP 101 may be designed to set "https" as the protocol for Location, even in a case where the "encryption of network communication" setting is OFF.

Here, in a case where the pull scan request cannot be normally processed in step S804 or step S805, the MFP 101 generates a response indicating an error to the pull scan request in the step.

In step S806, the MFP 101 transmits the pull scan response generated in step S804 or step S805 to the client terminal 102. In step S807, the MFP 101 executes a scan based on read settings included in the scan request. The MFP 101 waits for another request thereafter, and in a case where another request is accepted, the processing returns to step S801.

In step S808, the MFP 101 determines whether the request received in step S801 is a scanner status acquisition request. The MFP 101 determines that the request is a scanner status acquisition request in a case where the request is a GET method to "http://192.168.1.100/ScannerStatus" or "https://192.168.1.100/ScannerStatus". In a case where the request is a scanner status acquisition request (YES in step S808), the processing proceeds to step S809. In a case where the request is not a scanner status acquisition request (NO in step S808), the processing proceeds to step S810.

In step S809, the MFP 101 transmits a response similar to the response illustrated in FIG. 10A or FIG. 10B to the request source, depending on the status of the scanner. In a case where the scan job is being processed, the MFP 101 transmits a response similar to the response in FIG. 10A. In a case where the scan job is completed, the MFP 101 transmits a response similar to the response in FIG. 10B. In a case where the scanner status acquisition request cannot be normally processed, the MFP 101 transmits a response indicating an error.

In step S810, the MFP 101 determines whether the request received in step S801 is a scanned image acquisition request. The MFP 101 determines that the request is a scanned image acquisition request, if the request is a GET method to a URI designated in Location of the pull scan response transmitted in step S806. In a case where the request is a scanned image acquisition request (YES in step S810), the processing proceeds to step S811. In a case where the request is not a scanned image acquisition request (NO in step S810), the processing proceeds to step S812.

In step S811, the MFP 101 transmits the scanned image as a response, to the request source. In a case where the scanned image acquisition request cannot be normally processed, the MFP 101 transmits a response indicating an error. In step S812, the MFP 101 determines that an unsupported request is received, and the MFP 101 transmits a response indicating an error, to the request source. The MFP 101 waits for another request thereafter, and in a case where another request is accepted, the processing returns to step S801.

According to the first exemplary embodiment, when a pull scan instruction is transmitted from the client terminal 102 to the MFP 101, acquisition of an image file by the client terminal 102 can be processed in encrypted communication in a case where a file format designated by a user is an encrypted file format.

In a second exemplary embodiment, an example in which a pull scan request from the client terminal 102 to the MFP 101 is made in HTTPS communication depending on condition will be described.

The configurations of the apparatuses, the processing performed by the apparatuses and the displayed screens illustrated in FIGS. 1 to 6 are similarly applied in the present exemplary embodiment. However, in the present exemplary embodiment, the MFP 101 waits for HTTP communication and HTTPS communication from the client terminal 102 even in a case where the "encryption of network communication" setting is OFF.

Figure 11:
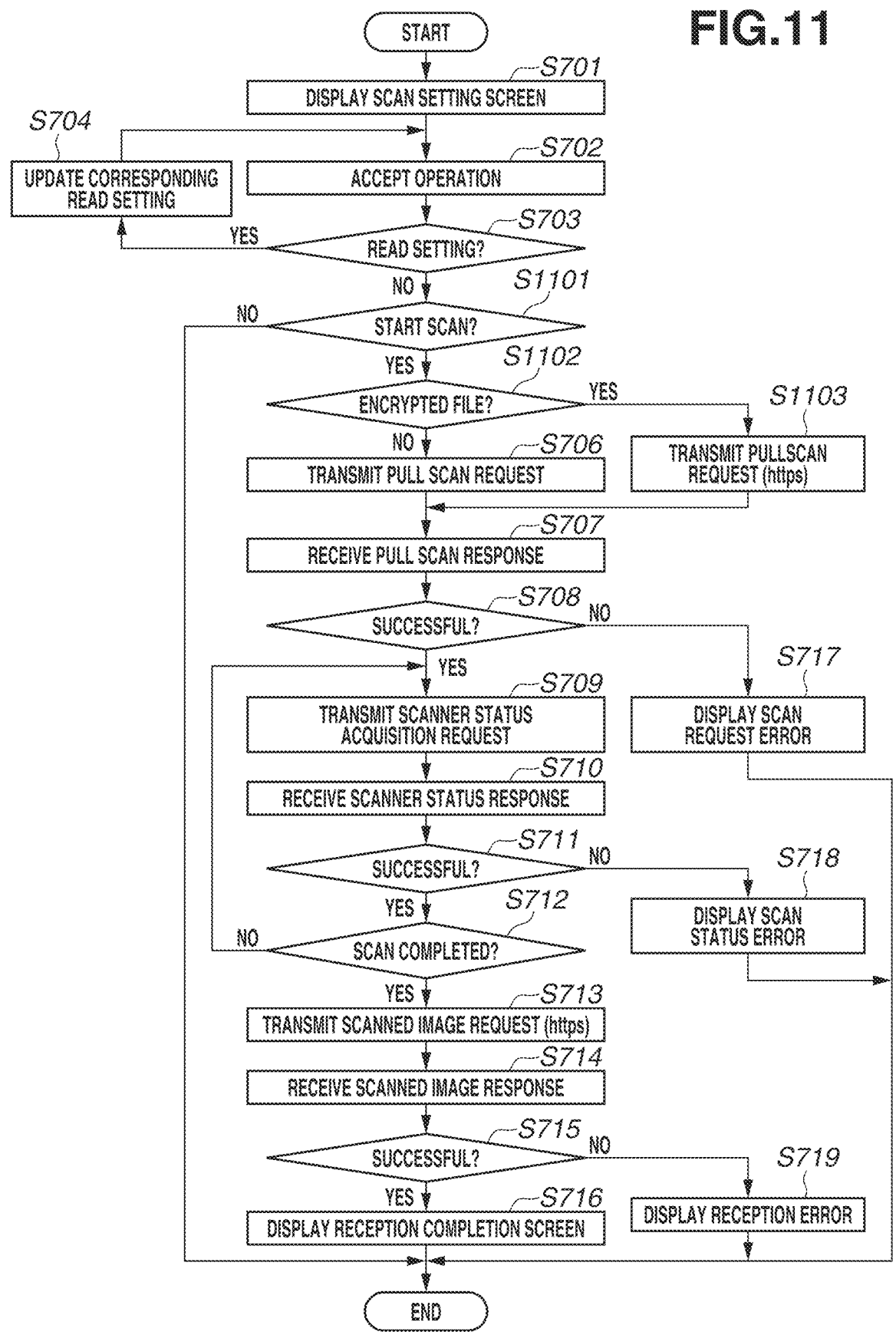
FIG. 11 is a flowchart illustrating processing in a client terminal according to a second exemplary embodiment.

FIG. 11 is a flowchart illustrating processing in the client terminal 102 in the second exemplary embodiment. The processing that is different from the processing described with reference to FIG. 7 will be specifically described with reference to FIG. 11.

Step S701 to step S704 and step S706 to step S719 are similar to those in FIG. 7, and thus the description thereof will be omitted.

In a case where a scan start operation is accepted (YES in step S1101), the processing proceeds to step S1102. In a case where the application ends without acceptance of a scan start operation such as a case where cancel processing is performed (NO in step S1101), this processing also ends.

In step S1102, the client terminal 102 determines whether the file format is an encrypted file format. In a case where encrypted PDF is selected by the "file format" setting button 406, the client terminal 102 determines that the file format is an encrypted file format. In a case where the file format is an encrypted file format (YES in step S1102), the processing proceeds to step S1103. In a case where the file format is not an encrypted file format (NO in step S1102), the processing proceeds to step S706.

In step S1103, the client terminal 102 transmits a pull scan request to the MFP 101.

FIG. 9A illustrates an example of the content of the pull scan request. The request is issued using a POST method to a Uniform Resource Identifier (URI) of "https://192.168.1.100/ScanJob". In FIG. 9A, an encryption password to be used to encrypt a file including scanned image data in MFP 101 is included. In other words, in the second exemplary embodiment, a communication path for transmitting the encryption password is also encrypted.

Figure 12:
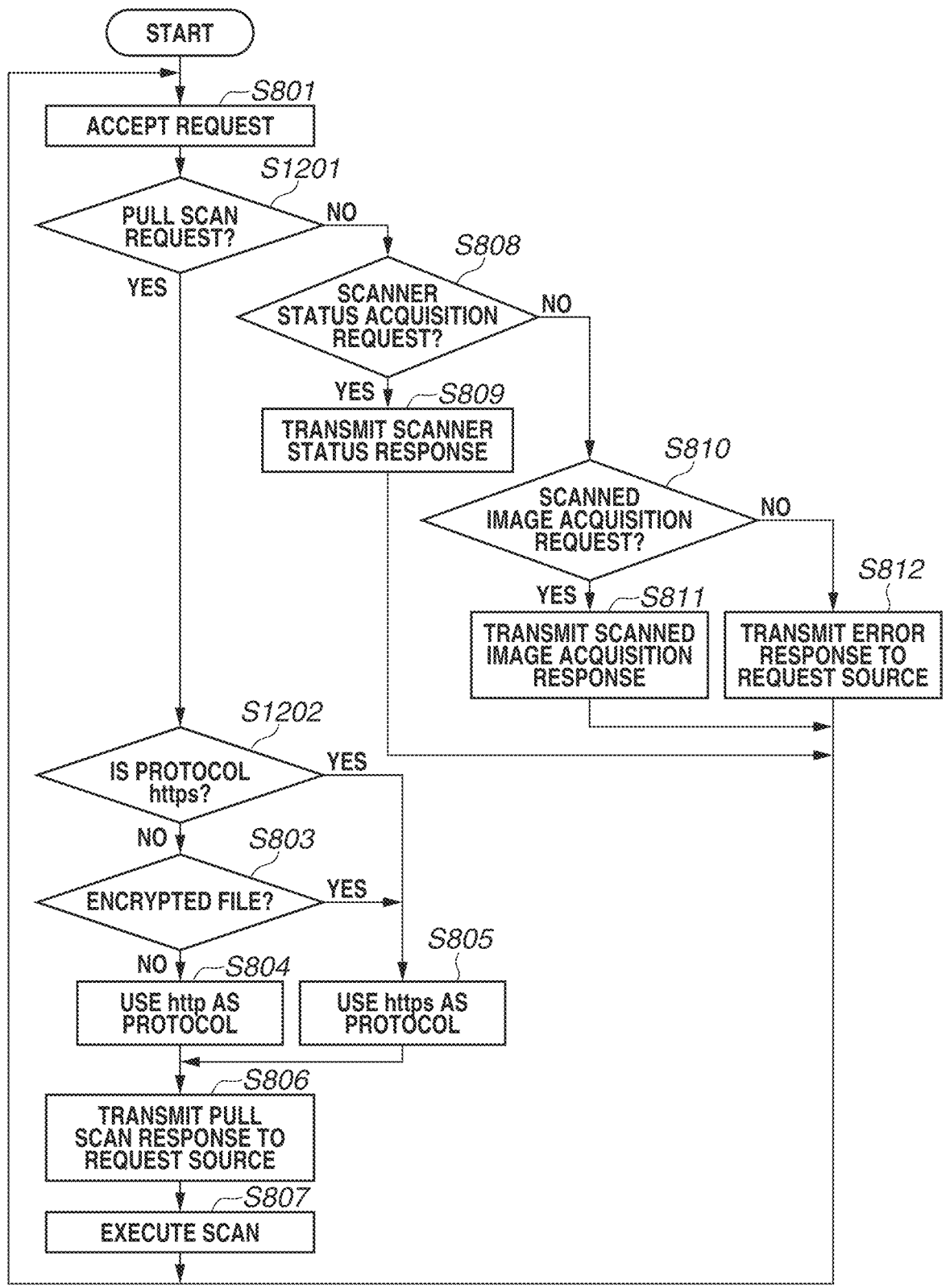
FIG. 12 is a flowchart illustrating processing in an MFP according to the second exemplary embodiment.

FIG. 12 is a flowchart illustrating processing in the MFP 101 in the second exemplary embodiment. The processing that is different from the processing described with reference to FIG. 8 will be specifically described with reference to FIG. 12.

Step S801 and step S805 to step S812 are similar to those in FIG. 8, and thus the description thereof will be omitted.

In a case where the request is a pull scan request (YES in step S1201), the processing proceeds to step S1202. In a case where the request is not a pull scan request (NO in step S1201), the processing proceeds to step S808.

In step S1202, the MFP 101 determines whether a protocol when the pull scan request is issued is HTTPS. In a case where the protocol is HTTPS (YES in step S1202), the processing proceeds to step S805. In a case where the protocol is HTTP (NO in step S1202), the processing proceeds to step S803.

According to the second exemplary embodiment, in a case where a file format designated by a user is an encrypted file format, encrypted communication can be used when the client terminal 102 transmits a pull scan request including an encryption password to the MFP 101.

In a third exemplary embodiment different, a description will be given of an exemplary embodiment different from the second exemplary embodiment in transmitting an encryption password in HTTPS communication in a case where an encrypted file format is designated as a file format in a pull scan request from the client terminal.

The configurations of the apparatuses, the processing performed by the apparatuses and the displayed screens illustrated in FIGS. 1 to 6 are similarly applied in the present exemplary embodiment.

Figure 13:
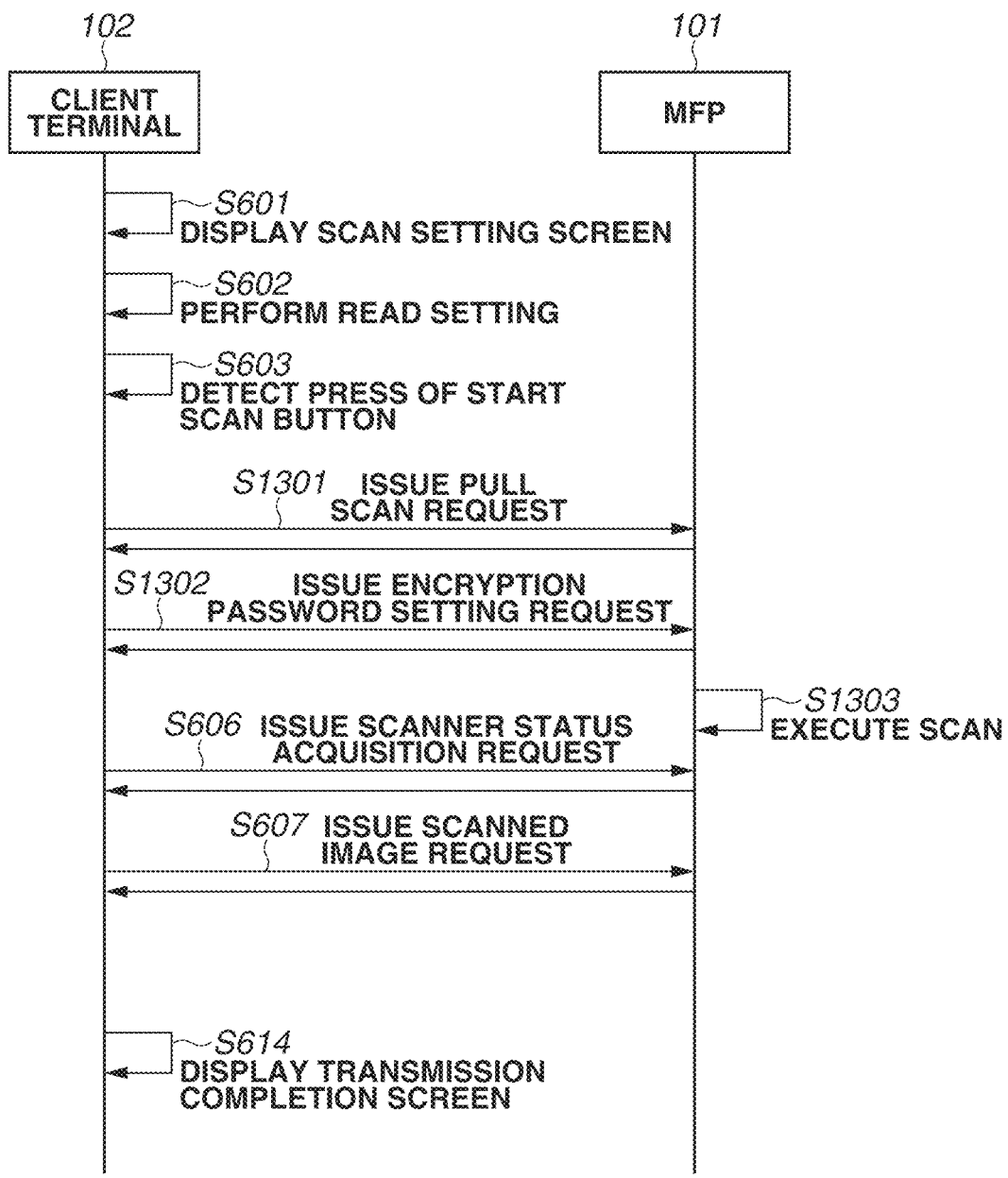
FIG. 13 is a diagram illustrating a sequence of processing performed by an MFP and a client terminal according to a third exemplary embodiment.

FIG. 13 illustrates a sequence of processing performed in the MFP 101 and the client terminal 102 in the present exemplary embodiment, which is different from the sequence in the first exemplary embodiment. A point different from FIG. 6 will be specifically described with reference to FIG. 13. Step S601 to step S603, step S606, step S607 and step S614 are similar to those in FIG. 6.

In step S1301, the client terminal 102 issues a pull scan request to the MFP 101, and the MFP 101 responds to the request. In step S1302, the client terminal 102 issues an encryption password setting request to the MFP 101, and the MFP 101 responds to the request. Subsequently, in step S1303, the MFP 101 executes scan processing.

In the first and second exemplary embodiments, the encryption password is designated in the pull scan request. However, in the present exemplary embodiment, an encryption password is designated in an encryption password setting request, not in a pull scan request.

Figure 14:
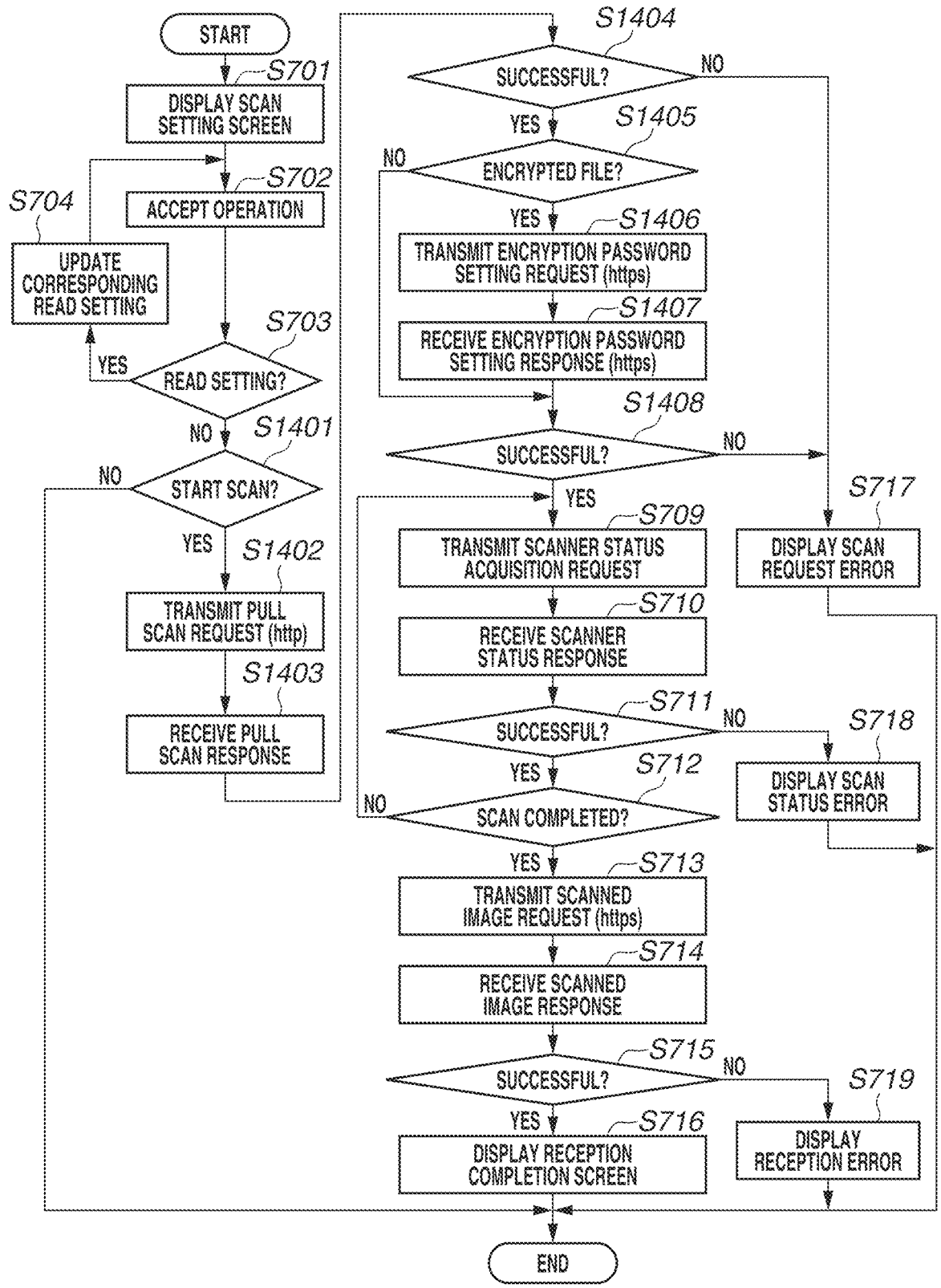
FIG. 14 is a flowchart illustrating processing in the client terminal according to the third exemplary embodiment.

FIG. 14 is a flowchart illustrating processing of the client terminal 102 in the third exemplary embodiment. The processing that is different from the processing described with reference to FIG. 7 will be specifically described with reference to FIG. 14.

Step S701 to step S704 and step S709 to step S719 are similar to those in FIG. 7, and thus the description thereof will be omitted.

In a case where the accepted operation is a scan start operation (YES in step S1401), the processing proceeds to step S1402.

In step S1402, the client terminal 102 transmits a pull scan request.

FIG. 16A illustrates an example of the content of the pull scan request. The request is issued using a POST method by HTTP communication to an URI of "http://192.168.1.100/ScanJob". Here, encrypted PDF is designated as the file format, but an EncryptionPassword element is not included.

In the present exemplary embodiment, an encryption password can be thus prevented from flowing in plain text on a communication path.

In step S1403, the client terminal 102 receives a pull scan response from the MFP 101. FIG. 16B illustrates an example of the content of the pull scan response. This is similar to the example illustrated in FIG. 9C.

In step S1404, the client terminal 102 confirms the content of the pull scan response and determines whether the reception of the response is successful. In a case where the reception of the response is successful (YES in step S1404), the processing proceeds to step S1405. In a case where the reception of the response is unsuccessful (NO in step S1404), the processing proceeds to step S717. In step S717, the client terminal 102 displays a message notifying that an error has occurred.

In step S1405, the client terminal 102 determines whether the file format is an encrypted file format. In a case where encrypted PDF is selected by the file format setting button 406, the MFP 101 determines that the file format is an encrypted file format. In a case where the file format is an encrypted file format (YES in step 1405), the processing proceeds to step S1406, and otherwise, the processing proceeds to step S1408.

In step S1406, the client terminal 102 transmits an encryption password setting request to the MFP 101. FIG. 17A illustrates an example of the content of the encryption password setting request.

The request is issued using a POST method by HTTPS communication to a URI of "https://192.168.1.100/ScanJob/1". This URI is similar to the URI set in Location of the pull scan response received in step S1403 with the protocol part replaced with https.

The encryption password setting request is composed of only an EncryptionPassword element of a ScanJob element of the pull scan request.

Here, because HTTPS communication is used, the encryption password flows in an encrypted communication path, so that leakage of the encryption password can be prevented.

In step S1407, the client terminal 102 receives an encryption password setting response from the MFP 101.

FIG. 17B illustrates an example of the encryption password setting response when the reception of the response is successful.

In step S1408, the client terminal 102 confirms the content of the encryption password setting response and determines whether the reception of the response is successful. In a case where the reception of the response is successful (YES in step S1408), the processing proceeds to step S709. In a case where the reception of the response is unsuccessful (NO in step S1408), the processing proceeds to step S717.

Figure 15:
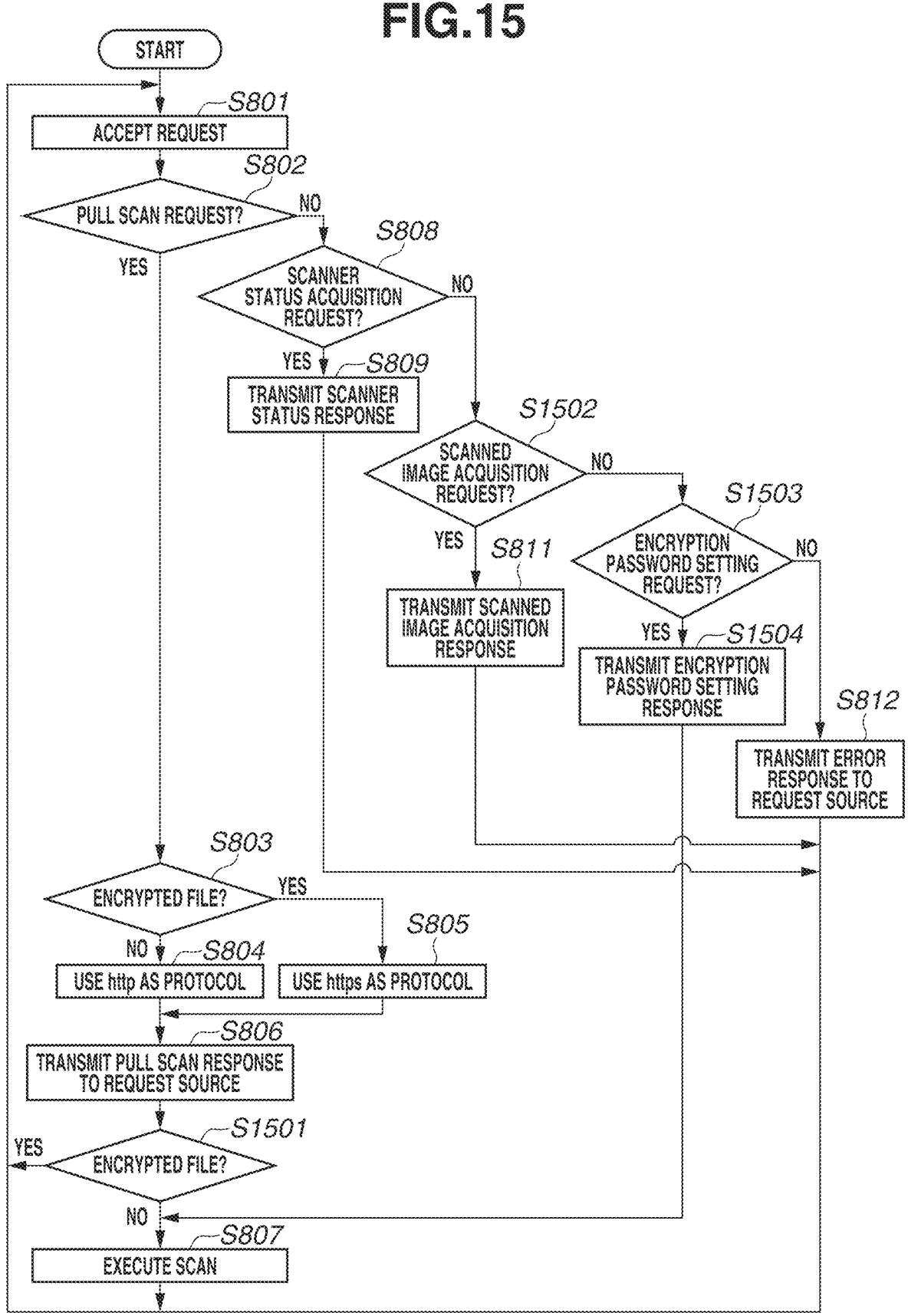
FIG. 15 is a flowchart illustrating processing in the MFP according to the third exemplary embodiment.

FIG. 15 is a flowchart illustrating processing of the MFP 101 in the third exemplary embodiment. The processing that is different from the processing described with reference to FIG. 8 will be specifically described with reference to FIG. 15.

Step S801 to step S806, step S807 to step S809, step S811, and step S812 are similar to those in FIG. 8, and thus the description thereof will be omitted In step S1501, the MFP 101 confirms the value of the Format element of the pull scan request and determines whether the file format is an encrypted file format. In a case where the value is EncryptedPDF, the MFP 101 determines that the file format is an encrypted file format. In a case where the file format is an encrypted file format (YES in step S1501), the processing returns to step S801. In a case where the file format is not an encrypted file format (NO in step S1501), the processing proceeds to step S807.

In step S1502, the MFP 101 determines whether the request received in step S801 is a scanned image acquisition request. The MFP 101 determines that the request is a scanned image acquisition request, if the request is a GET method to a URI designated in Location of the pull scan response transmitted in step S806. In a case where the request is a scanned image acquisition request (YES in step S1502), the processing proceeds to step S811. In step S811, the MFP 101 transmits the scanned image as a response, to the request source. In a case where the request is not a scanned image acquisition request (NO in step S1502), the processing proceeds to step S1503.

In step S1503, the MFP 101 determines whether the request received in step S801 is an encryption password setting request. In a case where the request is a POST method to a URI designated in Location of the pull scan response transmitted in step S806, and only an EncryptionPassword element is included in a ScanJob element in XML format, the MFP 101 determines that the request is an encryption password setting request. In a case where the request is an encryption password setting request (YES in step S1503), the processing proceeds to step S1504. In a case where the request is not an encryption password setting request (NO in step S1503), the processing proceeds to step S812.

In step S1504, the MFP 101 transmits an encryption password setting response to the client terminal 102. In a case where the encryption password setting request cannot be normally processed, an error response is transmitted.

According to the third exemplary embodiment, in a case where an instruction to generate an encrypted file is given to the MFP 101, encrypted communication can be used as communication in transmitting an encryption password to generate the encrypted file from the client terminal.

In the first to third exemplary embodiments, even if the value of the setting item "encryption of network communication" setting is OFF, the encrypted file, or the encrypted file and password, can be transmitted from the MFP to the client in the encrypted communication.

Although not described in the first to third exemplary embodiments, in a fourth exemplary embodiment, in a case where the encrypted PDF, or the encrypted PDF and password, is communicated by HTTPS in a state where the value of the "encryption of network communication" setting that is the setting item of the MFP 101 is OFF, this setting may be changed to ON.

The security in the network communication in transmission of the pull scan can be thereby improved.

In a fifth exemplary embodiment, on the assumption that the generation of an encrypted PDF is designated by a scan request from the client terminal 102, a password to be used for the encryption may be registered in the MFP 101 in advance. In this case, in the MFP 101, a user such as an administrator can register at least one of user information, a specific protocol, and a specific application in association with the password in the MFP 101 in advance.

In a case where the MFP 101 receives a scan request in which the generation of an encrypted PDF is designated, if a password associated with at least one of user information corresponding to the request source, a specific protocol, and a specific application has been already registered, the MFP 101 generates an encrypted PDF file using this password. This makes it unnecessary to transmit the password to the MFP 101 when the client terminal 102 transmits the scan request.

In a case where the MFP 101 receives a scan request in which the generation of an encrypted PDF is designated, if a password associated with at least one of user information corresponding to the request source, a specific protocol, and a specific application has not yet been registered in the MFP 101, a method according to any of the first to fourth exemplary embodiments described above can be adopted as appropriate. As compared with the conventional technique, a secure method of transmitting a password can be ensured.

A sixth exemplary embodiment will be described. In the second and third exemplary embodiments, the encryption password is transmitted from the client terminal 102 to the MFP 101 in the encrypted communication path (HTTPS communication). Here, the encrypted PDF file is transmitted from the MFP 101 to the client terminal 102 in these exemplary embodiments. In some cases, a user may think that the encrypted communication path (HTTPS communication) is not necessary for the transmission of the encrypted PDF file.

Accordingly, in the sixth exemplary embodiment, HTTP or HTTPS communication may be used when the encrypted PDF file is transmitted from the MFP 101, depending on the value of the "encryption of network communication" setting that is the setting item of the MFP 101.

Other Exemplary Embodiments

The present disclosure also includes an apparatus or system and a method thereof, which are configured by appropriately combining the above-escribed exemplary embodiments.

Here, the present disclosure is an apparatus or a system that executes one or more pieces of software (programs) for implementing the functions of the above-described exemplary embodiments. In addition, a method executed by the apparatus or the system to implement the above-described exemplary embodiments is also included in the present disclosure. Moreover, the programs are to the system or the apparatus via a network or any of various storage media, and the programs are read out into one or more memories and executed by one or more computers (CPUs or micro processing units (MPUs)) of the system or the apparatus. In other words, the programs themselves or various computer-readable storage media storing the programs are also included in the present disclosure. The present disclosure can also be implemented by a circuit (e.g., an application specific integrated circuit (ASIC)) that implements the functions of the above-described exemplary embodiments.

According to the exemplary embodiments of the present disclosure, it is possible to offer a technique more secure than the conventional technique, in a case where a file including scanned image data is encrypted in response to a scan request from an external apparatus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-160961, filed Oct. 5, 2022, which is hereby incorporated by reference herein in its entirety.

What is claimed is:

1. An image processing apparatus comprising:
a scanner;
one or more memories storing instructions, and
one or more processors capable of executing the instructions causing the image processing apparatus to:
receive a scan request from a client terminal via a network;
in a case where the scan request includes a designation related to an encrypted file, execute processing for causing the client terminal to transmit a password to be used in generation of the encrypted file by using an encrypted communication temporarily;
execute, based on the scan request, processing of generating a file including image data obtained by the image processing apparatus using the scanner;
encrypt the generated file based on the password received from the client terminal via the encrypted communication;
receive an image request from the client terminal; and
transmit the encrypted file to the client terminal in response to the image request.

2. The image processing apparatus according to claim 1, wherein the instructions further cause the image processing apparatus to transmit an instruction to set the communication for transmitting the file generated in the image processing apparatus to the client terminal as the encrypted communication, to the client terminal, in a case where the encrypted file is designated by the client terminal.

3. The image processing apparatus according to claim 1, wherein, in a case where the encrypted file is not designated by the client terminal for the file, the file generated in the image processing apparatus is transmitted to the client terminal without using the encrypted communication.

4. The image processing apparatus according to claim 3, wherein the instructions further cause the image processing apparatus to perform setting related to encryption of the communication on the network,
wherein, in a case where the encrypted communication is designated not to be used in the setting, and the encrypted file is not designated by the client terminal for the file, the file generated in the image processing apparatus is transmitted to the client terminal without using the encrypted communication.

5. A control method in an image processing apparatus including a scanner, the control method comprising:
receiving a scan request from a client terminal via a network;
in a case where the scan request includes a designation related to an encrypted file, executing processing for causing the client terminal to transmit a password to be used in generation of the encrypted file by using an encrypted communication temporarily;
executing, based on the scan request, processing of generating a file including image data obtained by the image processing apparatus using the scanner;
encrypting the generated file based on the password received from the client terminal via the encrypted communication;
receiving an image request from the client terminal; and
transmitting the encrypted file to the client terminal in response to the image request.

6. The control method according to claim 5, further comprising transmitting an instruction to set the communication for transmitting the file generated in the image processing apparatus to the client terminal as the encrypted communication, to the client terminal, in a case where the encrypted file is designated by the client terminal.

7. The control method according to claim 5, wherein, in a case where the encrypted file is not designated by the client terminal for the file, the file generated in the image processing apparatus is transmitted to the client terminal without using the encrypted communication.

8. The control method according to claim 7, further comprising performing setting related to encryption of the communication on the network,
   wherein, in a case where the encrypted communication is designated not to be used in the setting, and the encrypted file is not designated by the client terminal for the file, the file generated in the image processing apparatus is transmitted to the client terminal without using the encrypted communication.

* * * * *